United States Patent [19]

Griffith et al.

[11] 4,090,119

[45] May 16, 1978

[54] TORQUE ANALOG OF A SERIES WOUND DC TRACTION MOTOR

[75] Inventors: Robert James Griffith, Erie, Pa.; Allan Barr Plunkett, Scotia, N.Y.

[73] Assignee: General Electric Company, Erie, Pa.

[21] Appl. No.: 714,080

[22] Filed: Aug. 12, 1976

[51] Int. Cl.² .................................................. H02P 7/00
[52] U.S. Cl. ................................... 318/432; 318/338; 318/109; 246/187 R
[58] Field of Search ............ 328/5, 77, 78, 85, 59–64, 328/338, 432; 290/48; 322/36, 37; 246/187 C, 187 R, 187 A; 318/106–109

[56] References Cited

U.S. PATENT DOCUMENTS

| | | | |
|---|---|---|---|
| 3,358,613 | 12/1967 | Smith et al. | 246/187 A |
| 3,656,037 | 4/1972 | Donaldson | 318/59 |
| 3,735,226 | 5/1973 | Pittner | 318/432 |
| 3,887,855 | 6/1975 | Klimo | 318/338 |
| 3,950,684 | 4/1976 | Peterson | 318/338 |

*Primary Examiner*—David Smith, Jr.
*Attorney, Agent, or Firm*—J. H. Beusse

[57] ABSTRACT

Apparatus for electronically simulating the response of a direct current traction motor to predetermined operating states whereby there is provided a resultant signal representative of the torque that would be produced by an actual motor operating in the prescribed states. The apparatus calculates E per RPM for the simulated motor from measured values of available armature voltage and armature velocity. A function generator thereafter converts the E per RPM signal to a signal representative of the motor field current based upon known values for the simulated motor. The field current signal is converted to an armature current signal by a circuit which responds to the motor commanded state of field weakening to compute the instantaneous ratio of armature current to field current under the commanded conditions and thereafter multiplies the field current signal by that ratio to obtain a signal representative of armature current. Multiplication of the armature current signal by the E per RPM signal then yields a signal representative of the torque which would be developed by the simulated motor.

18 Claims, 4 Drawing Figures

TORQUE ANALOG OF A SERIES WOUND DC TRACTION MOTOR

BACKGROUND OF THE INVENTION

The present invention relates to electric traction motor vehicles and, more particularly, to a system for obtaining a signal representative of the torque response of a series would direct current electric traction motor in a resistor controlled motor powered vehicle.

Transit vehicles such as subway cars are typically operated in trains, i.e., a plurality of cars are mechanically and electrically coupled to operate as a single unit. However, each car in the train has its own propulsion and control system, the control system being connected to receive operating command signals from a lead car in the train. Historically, the propulsion and control systems in each car have been essentially identical electrical systems, e.g., direct current (d-c) series wound traction motors provided motive power and a cam controller regulated the power supplied by the d-c motors. Since each car's electrical motive power system was essentially identical, an operator's command to a train of cars would result in each car responding essentially identically. Thus each car's motive power system need only be capable of supplying the power required for that car. This maximum level of required power becomes a fundamental consideration since in order to make a transit or subway car economically practical, passenger space must be maximized at the expense of available space for motive power equipment. As will be appreciated, if the motive power system on one of the cars of a train attempts to develop more acceleration than that of other cars of the train, that car will attempt to pull the entire train to the detriment of its motive power system.

In a cam controlled direct current traction motor power system, a plurality of cams mechanically coupled to a central shaft are arranged to selectively actuate a plurality of electromechanical contactors. These contactors serve to connect the d-c traction motors on the car into particular configurations. For example, in one position the armature windings of several motors may be serially connected across a d-c power source so that each motor operates on some fraction of the total source voltage. In a second position the armature winding of each motor may be connected across the d-c power source so that full source voltage is available to each motor. The cam controller also controls contactors which selectively add or subtract series resistors from the armature current path of the motors in order to regulate armature current, or rather to maintain armature current at a constant level until the d-c motor characteristics force the current to decay below the regulated level. Thus the motive power produced by the d-c motors is controlled by controlling the mode of operation of the motors rather than directly regulating output power.

When a different type of motive power system is to be utilized in selected cars of a train in which other cars of the train employ cam controlled series wound d-c motors, it is apparent that the control systems of one type of the motive power systems must be modified to respond to the type of operator's command being used by the other type of power system. For example, if an alternating current (a-c) induction motor is to be used to propel one car of a train, the control system for the a-c motor must be adapted to control the a-c motor in such a manner that the torque or power developed by the a-c powered car is equivalent to or matches the power developed by each of the d-c powered cars. A similar problem arises if the traction motor is a separately excited d-c motor or a shunt-wound d-c motor.

Accordingly, it is an object of the present invention to provide a method and apparatus for deriving a torque analog of a series wound d-c electric traction motor.

SUMMARY OF THE INVENTION

In a preferred embodiment of the present invention teaches a method and apparatus for deriving a signal representative of the torque developed by a series wound d-c motor as a function of a plurality of condition determinative input signals wherein the torque signal may then be utilized to control another motor. In particular the invention contemplates a system connected to receive a plurality of input signals in the form of signals specifying selected operating parameters for a d-c motor. The input signals specify the d-c operating voltage being applied to the motor, whether the motor is to be operated at full or weak field, and the regulated magnitude of armature current for the series wound d-c motor. The d-c operating voltage is modified by subtracting therefrom a signal representative of motor internal voltage losses to thereby produce a signal representative of effective armature volts. The effective armature volts signal is thereafter divided by a signal representative of the rotational velocity of the controlled motor to produce a signal representative of volts per revolution per minute (RPM), this latter signal being representative of motor flux. A function generator then converts the volts per RPM signal to a signal corresponding to the d-c motor field current which would exist at that value of volts per RPM. The field current signal is multiplied by a factor corresponding to the degree of field weakening to thereby produce a signal representative of motor armature current for the series wound d-c motor. The armature current signal is multiplied by the volts per RPM signal to produce the signal representative of torque of the series wound d-c motor. The armature current signal is also applied through a feedback loop to generate the signal representative of motor internal voltage losses.

DESCRIPTION OF THE DRAWINGS

These and other objects, features and advantages of this invention will be better understood by reference to the following detailed description when considered in conjunction with the accompanying drawings in which.

DETAILED DESCRIPTION

Figure 1:
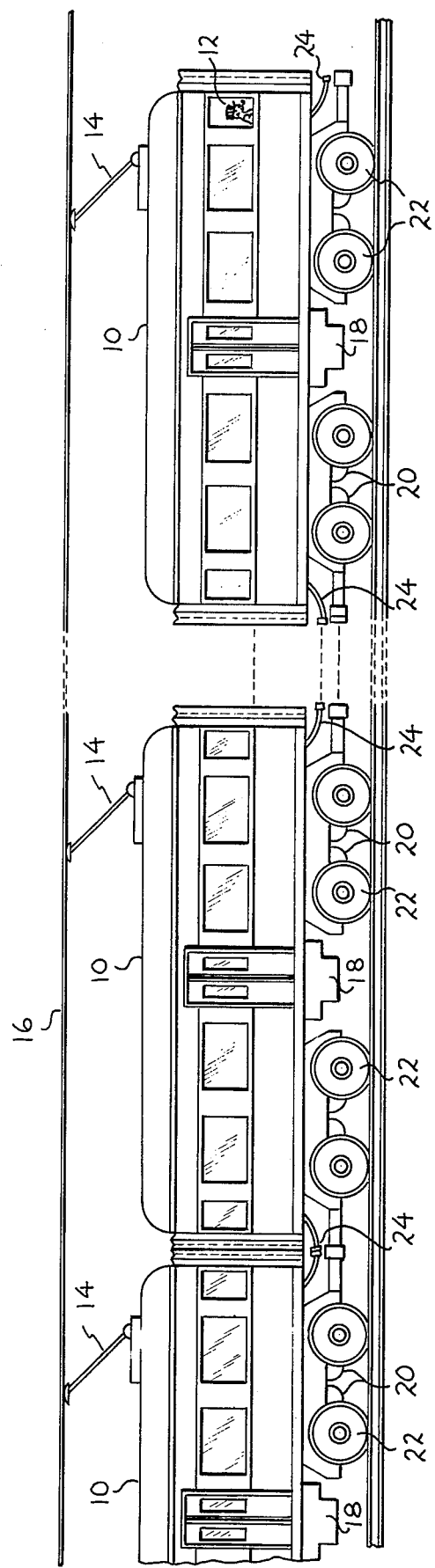
FIG. 1 is an illustration of a transit vehicle arrangement indicating the interconnection of diverse types of propulsion systems.

Referring to FIG. 1 there is shown a plurality of electrically powered transit vehicles 10 mechanically and electrically connected to operate in a train in response to commands from an operator 12. Each vehicle 10 includes a pantograph 14 adapted to receive power from an overhead catenary 16 and to supply power through a control system 18 to electric traction motors 20 mounted in driving relationship with vehicle wheels 22. The operator commands, generally referred to as train line signals, are supplied to the control systems 18 via train line cables 24 which electrically interconnect the transit vehicles. The train line signals are status signals which specify the commanded operating states of the traction motors which, in terms of series-wound d-c motors, are generally full field, intermediate field or minimum field along with a particular maximum armature current level. The operator 12 may also call for series or parallel connection of the motors on a vehicle, i.e., a selected number of motors may be connected in series so that only a fraction of the voltage on catenary 16 is available to each motor or each motor may be connected in parallel whereby the full catenary voltage is available to each motor. It is noted that the train line signals to each vehicle 10 are identical and thus that each vehicle must respond essentially identically if the tractive effort of the train is to be distributed uniformly over the train so that no one of the vehicles 10 attempts to pull the entire train.

Figure 2:
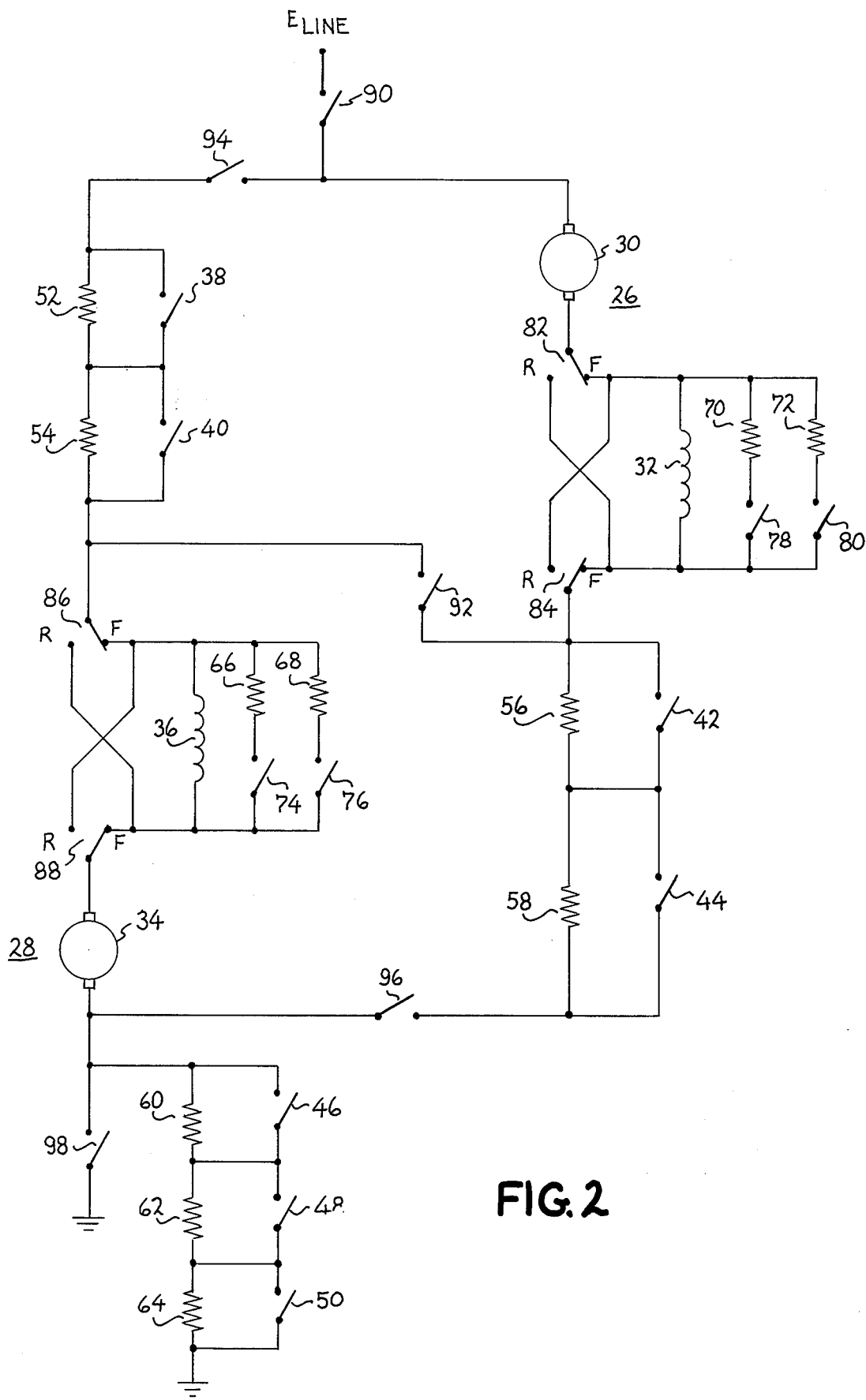
FIG. 2 is a simplified schematic diagram of a prior art resistor controlled d-c motor system.

Referring now to FIG. 2, there is shown a simplified schematic of a contactor controlled power circuit such as that shown at 18 in FIG. 1 for a pair of direct current series wound electric traction motors 26 and 28. The traction motor 26 includes an armature 30 and a field winding 32 serially connected therewith. The traction motor 28 includes an armature 34 and a field winding 36 serially connected therewith.

The circuit is also provided with a series of contactors numbered 38 through 50 which are cam actuated by a motor driven controller (not shown) in a preselected sequence to step resistance out of the circuit to control the tractive effort of the motors 26 and 28. The contactors 38 through 50 are associated with load resistors 52 through 64 respectively, which load resistors are connected as shown to limit current flow through the traction motors and their associated field windings to control motor acceleration.

Shunt switching means in the form of resistors 66 through 72 and contactors 74 through 80 are associated with motor field windings 32 and 36. The contactors 74 through 80 allow the resistors 66 through 72 to be selectively connected in parallel with respective field windings 32 and 36 to provide field weakening of the motors 26 and 28 at higher motor speeds.

Included in the circuit of FIG. 2 are four cam actuated reversing contactors 82, 84, 86, and 88. The reversing contactors are in the form of single pole double throw switches and are arranged to connect the traction motor field windings for either the forward or reverse modes of operation. The traction system receives a voltage $E_{LINE}$ from a direct current source (not shown) which may be connected to the system via the aforementioned catenary 16 and pantograph 14 through a switch 90.

A relay actuated switch 92 is arranged to connect the two traction motors 26 and 28 and their respective field windings in series relationship with the load resistors 60, 62, and 44 to form a high resistance connection which is used over the lower speed ranges where the generated back electromotive force (EMF) of the traction motors is of lower magnitude. A parallel connection, adapted for use in the higher speed ranges, is formed by the opening of the switch 92 and the closing of relay operated switches 94, 96, and 98. With the latter arrangement, two series connected circuit banks are connected in parallel with each other, one bank being formed by the series connection of traction motor 26 with its field winding 32 and the load resistors 56 and 58 and the other bank being formed by the series connection of traction motor 28 with its field winding 36 and the load resistors 52 and 54.

It will be noted that for the series connection formed by the closing of switch 92 with switches 94, 96, and 98 being opened, the load resistors 52, 54, 56, and 58 are cut out of the circuit, and for this connection resistance switching of the load resistors 60, 62, and 64 is relied upon for control of tractive effort. For the parallel connection, with switch 92 open and switches 94, 96, and 98 closed, the load resistors 60, 62, and 64 are cut out of the circuit by the shunt connection formed by switch 98, and for this arrangement control of tractive effort is accomplished by resistance switches of the resistors 52, 54, 56, and 58.

It should be noted that the circuit of FIG. 2 is highly simplified and that in an actual power circuit the staging resistors 52 through 64 would likely comprise at least twice the number of resistors illustrated and the contactors 38 through 50 would be increased even more and arranged to provide serial and parallel connections of the associated resistors. Such arrangements are well known in the art and are shown and described for example, in U.S. Pat. Nos. 3,184,664 and 3,068,390. Similarly, the shunt resistors 66 through 72 providing field weakening generally comprise a plurality of resistors which allow rlatively small steps of current shunting to be accomplished thereby allowing armature current to be regulated at a substantially constant magnitude until all the stages of resistance have been utilized.

In the operation of the circuit of FIG. 2, with switch 90 and 92 closed, power is applied through motor 26, switch 92, motor 28 and resistors 60, 62, and 64 and an initial current is established through this circuit path. As the motors begin to pick up speed the back EMF of the motors subtracts from the applied voltage causing the motor current to begin to fall off. The motor driven controller begins to step through its various positions sequentially closing the contactors 46, 48, and 50 in order to maintain the current through the motors 26 and 28 at a regulated level. Once the resistors 60, 62, and 64 have been removed from the circuit and the motors 26 and 28 are connected directly across the power source, the controller steps through another sequence and opens the contactor 92 while closing the contactor 94, 96, and 98. This action results in the motors 26 and 28 being connected in parallel circuit arrangement across the power source with resistors 52, 54, 56, and 58 connected in series with their respective motors. It is noted that the resistors 52, 54, 56, and 58 are selected such that when the motors are placed in parallel across the power source the initial voltage across the motor remains the same as it was just prior to the switching action. The controller then continues to step through its various positions and selectively closes contactors 38, 40, 42, and 44 to thereby remove the additional series resistance from their respective motor circuits thereby resulting in motors 26 and 28 being connected in parallel directly across the power source.

If nothing further were done at this time the reverse EMF of the motors would continue to build up with speed and the torque would begin to fall off along the motor characteristics curves as a result of the decrease in motor flux and armature current with the increase in motor speed. As is well known, however, in order to maintain the armature current at the regulated level and thereby maintain the motor torque at a higher level, the resistors 66, 68, 70, and 72 are connected in parallel with their associated motor field windings to thereby shunt a portion of the armature current away from the corresponding field winding. The motor controller thereby begins to step through additional positions and selectively closes the contactors 74, 76, 78, and 80 to thereby place the motors 26 and 28 into a weak field mode of operation. In this weak field condition the torque drops, although not as rapidly as it would with a constant field, but the horsepower of the two motors is maintained at a constant level. After the contactors 74, 76, 78, and 80 have all been closed the motor armature current begins to decrease as the back EMF of the motors 26 and 28 increases thereby causing the torque output of the motors to drop along the motor characteristic curves.

Figure 3:
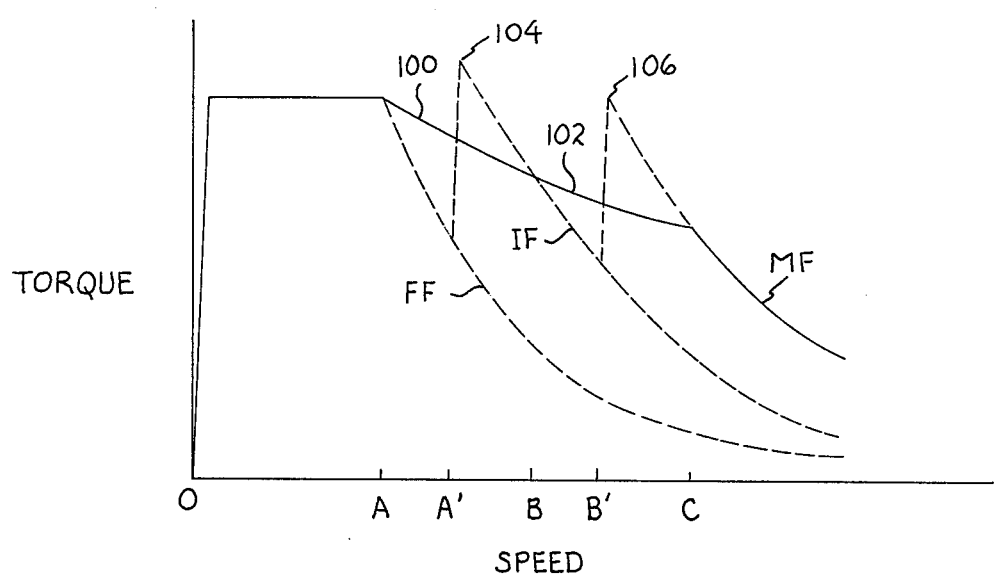
FIG. 3 is a graph illustrating typical d-c motor operating characteristics.

For a better understanding of the operations of the motors 26 and 28 reference may be had to FIG. 3 in which there is shown a typical torque versus speed curve for a series connected direct current electric traction motor. As can be seen, when power is applied, motor torque rises rapidly to a regulated level as a result of armature current through the motor rising to a regulated level. The armature current is regulated at a substantially constant level from speed 0 to speed A by sequentially removing resistors from the motor current path as was described previously with reference to FIG. 2. Accordingly, motor torque remains substantially over this range. At point A all the resistance has been removed from the motor path and the motor is placed directly across the power source. If no further action were taken the motor torque would fall off along the curve marked FF, for Full Field, dropping rapidly as armature current dropped as a result of the back EMF of the motor increasing with motor speed. However, as was previously described, at the point A field weakening is initiated by connecting shunt resistors in parallel with the motor field winding so that motor armature current is bypassed around the field winding thereby maintaining armature current at the regulated level.

As previously described an actual motor power circuit will include a plurality of shunt resistors thereby allowing armature current to be substantially smoothly regulated. In general, a command for an intermediate field (IF) condition will result in a plurality of resistors being selectively connected in parallel with the motor field winding so that the motor torque will follow the curve marked 100 from speed A to speed B. At speed B the ratio of field current to armature current will have reached the commanded value for an IF condition, e.g., field current may be 40% of armature current for IF. Without a change in the commanded value, the armature current will no longer be regulated and torque will therefore begin to drop rapidly along the curve marked IF. However, if at point B a minimum field (MF) condition is commanded, additional resistance staging will be implemented and the motor torque will follow the curve marked 102 from point B to point C. At point C the MF condition, e.g., field current may be one-third armature current, is achieved and the torque begins to drop rapidly along the MF curve.

For the illustrated motor circuit only two stages of resistance are shown; therefore, the torque regulation circuit would allow motor torque to follow the full field (FF) curve to speed A' before connecting a resistor in parallel with the field. When the IF resistor is connected in shunt, the motor torque will jump rapidly to point 104 and then fall along the IF curve to speed B'. At speed B' the MF resistor is connected in shunt and the torque will jump to point 106 and then fall along the MF curve. It will be appreciated by those skilled in the art that the curves indicated at 100 and 102 are the desired motor curves and represent the theoretical average of torque over the operating range of the motor. In particular it will be noted that because the control is a resistor control which places steps of resistance in and out of the circuit, the actual torque curve would appear as a series of saw tooth waveforms having an average value substantially as indicated by line segments 100 and 102. Of course the more resistance steps that are placed in the motor current path the smaller these steps of torque will be and more closely the actual value of torque will approach the desired value of torque.

Figure 4:
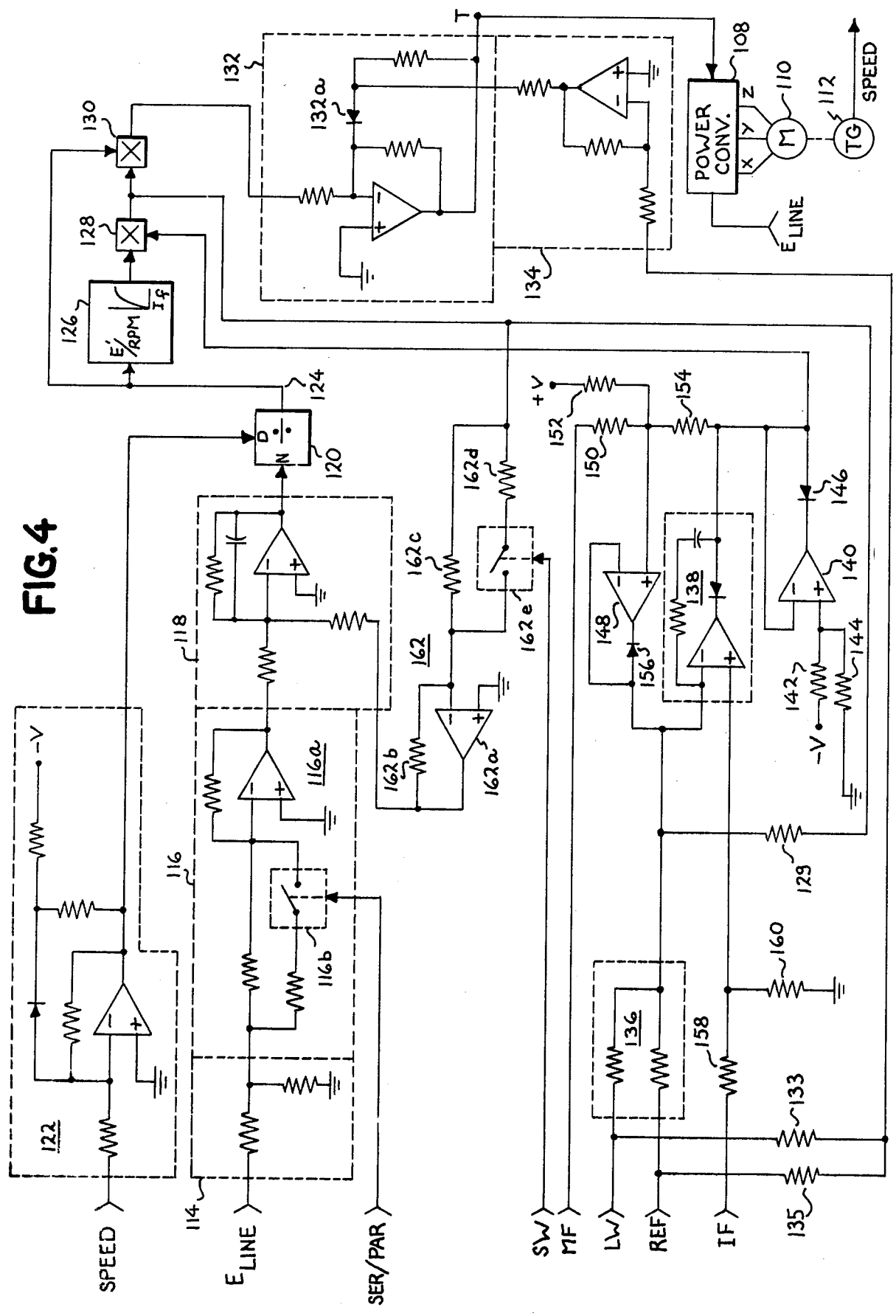
FIG. 4 is a schematic diagram illustrating the present invention.

Referring now to FIG. 4 there is shown a schematic diagram of a system according to the present invention which is an analog of the motor circuit of FIG. 2 and provides an output signal representative of the torque developed by one of the motors of the circuit of FIG. 2. The torque signal developed by the inventive system may be utilized to control a shunt would or separately excited d-c motor or an a-c motor system such as that illustrated in FIG. 4. The torque command signals may be applied, for example, as an input command to a control system 108 which applies alternating current excitation over lines X, Y, Z to an alternating current induction motor 110. The control system 108 may be, for example, a control system such as that described in U.S. Pat. No. 3,899,725 — Plunkett issued Aug. 12, 1975 and assigned to the General Electric Company. A tachometer generator (TG) 112 is geared to the rotor of motor 110 and provides an output signal representative of the actual angular velocity or speed of the motor.

The input signals to the system of FIG. 4 are the status signals or train line signals which are normally applied to the resistive control circuits for controlling the d-c series wound motors as described in FIG. 2. The $E_{LINE}$, the load weight (LW) and speed feedback signals may, however, be derived by direct measurement. The development of these train line signals is well known in the art and in one form thereof is described in U.S. Pat. No. 2,566,898. Since the inventive system is designed to interpret these train line signals and provide an output signal representative of the torque which will be developed by a d-c series wound motor in response to these signals, the system must simulate the response of the d-c motor to the train line signals. Although the inventive system is designed to simulate a series-wound d-c motor under dynamic operating conditions, it will be appreciated that the system will produce an output signal representative of the armature current and torque of a d-c motor under static conditions. For example, all the system input signal may be arbitrarily chosen, including the speed signal, and the system will produce output signals corresponding to the chosen input signals.

The inventive system initially determines the voltage which would be applied to the series wound d-c motor. In this regard a signal $E_{LINE}$ representative of the voltage of the d-c line or d-c source is applied to a first scaling circuit 114 where the line voltage signal is multiplied by a constant to obtain a signal within the voltage range of the electronic system. This voltage is modified in a summing junction 116 by adding to it an additional value if the motors are being operated in parallel rather than in series connection, i.e., if full source voltage rather than a fraction of the available is being applied to the motor.

Summing junction 116 may comprise, for example, an amplifier 116a connected in an operational amplifier configuration. For series motor operation the voltage seen by each of the two motors of the illustrative system of FIG. 2 is approximately one-half line voltage. Junction 116 controls this relationship by means of a switch 116b which is responsive to a train line status signal indicated as SER/PAR (for series or parallel) to control the input resistance to amplifier 116a. As is well known the gain of an operational amplifier is proportional to the feedback resistance divided by the input resistance. Thus, to simulate the parallel motor connection, the switch 116b is closed placing two resistors of equal value in parallel whereby the input resistance is reduced to half and the gain of the amplifier is doubled. The switch 116b may be, for example, a type CD4016 analog switch such as is manufactured and sold by the RCA Corp. The output voltage developed at summing junction 116 will therefore represent the applied motor voltage for either series or parallel motor connection.

In order to obtain the effective working voltage of the motor the voltage signal from junction 116 must be further modified by subtracting from it a value representative of the motor internal voltage losses. These losses are calculated by multiplying the motor internal resistance by the actual value of armature current in a manner to be hereinafter described. The motor voltage and the "loss" voltage are summed in a summing junction 118, also illustrated as an operational amplifier, to produce an output signal representative of effective armature voltage. This latter signal is then applied to a first input terminal of a divider circuit 120, a second input terminal of divider circuit 120 being connected to receive and divide the effective armature voltage signal by the speed signal from TG 112. Since the armature voltage is to be divided by the speed of the motor a minimum limit circuit 122 serially connected between TG 112 and divider circuit 120 limits the speed signal to some value greater than 0 in order to avoid by zero conditions. Divider circuit 120 may be, for example, a type 4290 one quadrant divider such as is available from Burr-Brown, Inc. The minimum limit circuit 122 may be, for example, an operational amplifier circuit with biased diode feedback as is illustrated. Such limit circuits are well known in the art and are shown and described in section 6.2 et seq. of the textbook Operational Amplifiers — Design And Applications prepared by Burr-Brown Research Corp. and published by McGraw-Hill Book Company in 1971. Accordingly, a detailed description of limit circuit 122 is omitted.

The output signal developed by divider circuit 120 represents the volts per revolution per minute (E/RPM) of the motor 110 and, as is well known, the volts per rpm of a motor corresponds substantially to the flux level of the motor. The E/RPM signal is applied via line 124 to a diode function generator 126 of the type such as that described in the text Applications Manual For Operational Amplifiers, second edition, pp. 50-51, published in 1966 by the Teledyne-Philbrick Company of Dedham, Mass. This function generator 126 has a first input terminal connected to receive the E/RPM signal and is responsive thereto to produce an output signal corresponding to the field current which would produce that particular value of E/RPM in a series wound d-c electric motor. The particular function which is implemented in the function generator 126 is of the type described on page 138 of the text Electric Machinery by Fitzgerald and Kingsley, second edition, Copyright 1961 my McGraw-Hill Book Company, Inc. For any particular d-c series wound electric motor the curves of E/RPM vs. field current may be derived as explained in the above-referenced Electric Machinery text from the manufacturer's motor data or from measured characteristics.

In order to convert the field current signal developed by function generator 126 into an armature current signal, the field current signal is multiplied by a factor representative of the amount of field weakening being commanded by the train line signals. In particular, a multiplier device 128 has a first input terminal connected to receive the field current signal and a second input terminal connected to receive a multiplier factor, which factor in the case of a full field condition would be unity and in the case of a minimum field condition may be three or more. Multiplying device 128 may be, for example, a device such as an AD532 analog multiplier of the type manufactured and sold by Analog Devices, Inc. The output of device 128 is a signal representative of the armature current of the d-c motor.

In some control applications the control system is designed to accept a current command signal for controlling electric traction motor operation. Such a system is illustrated, for example, in U.S. Pat. No. 3,911,340— Plunkett, issued Oct. 7, 1975 and assigned to the General Electric Company. In this type of system the armature current signal developed by device 128 may advantageously be used as a control signal. However, in a preferred embodiment, the present invention contemplates conversion of the armature current signal to a torque signal before application to a motor control system.

As is well known the product of armature current and E/RPM is representative of the torque of a d-c motor. Accordingly, the armature current signal from device 128 is multiplied by the E/RPM signal developed at the output of circuit 120 in a second multiplier device 130. The multiplier device 130 may also be a device such as the aforementioned analog device AD532. The output of multiplier device 130 represents the torque which would be developed by one of the d-c series wound motors in the control system of FIG. 2. As will be appreciated by reference to FIG. 3 the torque of the d-c motor from speed 0 to speed A is maintained constant by maintaining the armature current constant; however, rather than implement this constant function by adding an additional feedback loop it has been found more economical to limit the maximum torque level at the output terminal of multiplier device 130. Accordingly, the torque output signal of multiplier device 130 is applied to a maximum limit circuit 132 which clamps the torque signal to a level corresponding to the maximum level to be developed by the d-c series wound traction motor. Limit circuit 132 is of the type described in the aforementioned text Operational Amplifiers-Design and Applications.

As is well known, the maximum torque level is modified by the vehicle weight in most transit vehicle applications. Thus a load weight signal (LW) is applied through a resistor 133 to a scaling circuit 134 which scales the LW signal to a value appropriate for use in the electronic circuit and applies it as an input signal to the maximum limit circuit 132 to adjust the maximum torque level as a function of vehicle weight. As can be seen the maximum torque level adjustment is performed by varying the bias voltage applied to a feedback diode 132a in the operational amplifier circuit which forms limit circuit 132. The LW signal is a signal proportional to vehicle weight and in general transit vehicle practice is obtained from a pressure or weight transducer (not shown) mounted on the vehicle. It is noted that the current reference signal (REF) is also applied to scaling circuit 134 through a resistor 135. The REF signal also functions to vary the maximum torque signal level but in response to the maximum commanded current level.

The multiplier factor which is utilized to convert the field current signal to an armature current signal in multiplier device 128 is controlled by a feedback loop which sums the signal representative of actual armature current from device 128 with an armature current reference signal. The armature current reference signal is that value of armature current which the control circuit for the d-c series wound motor would utilize as a regulated value of armature current. The train line signals include a reference signal which establishes a desired magnitude of armature current for the resistor controlled motor system. However, this magnitude is modified by the weight of the associated transit vehicle since the acceleration of the vehicle for a given motor torque is proportional to vehicle weight. In the inventive system the reference signal (REF) and the LW signal are summed in a summing junction 136 to produce a vehicle weight modified reference signal. The modified reference signal and the armature current signal are thereafter combined in an operational amplifier circuit 138. In particular the output terminal of summing junction 136 and the output terminal of multiplying device 128 (through a resistor 129) are connected to an inverting input terminal of amplifier 138. Circuit 138 is of a type well known in the art and, in addition to summing the reference signal and the armature current signal to produce an error signal, also serves to provide a transfer function of the type $K_1/S + K_2$ for amplifying the error signal to supply an appropriate field control signal for application to device 128 as a multiplying factor. Circuit 138 is of the type described in the test Feedback Control Systems, Analysis And Synthesis by D'Azzo and Houpis, second edition, published in 1966 by McGraw-Hill Book Company, Inc., New York, N. Y.

The output signal developed by amplifier circuit 138 for controlling multiplier device 128 is limited to selected maximum and minimum values as a function of whether the d-c motor being simulated is to be operated in a full field, intermediate field or minimum field conditions. The limiting functions are controlled by train line signals which specify the commanded value of field weakening. In particular the control signals for field weakening are identified as IF for intermediate field and MF for minimum field. In the absence of both these signals, the command is understood to be for full field, i.e., armature current and field current are equal.

In a preferred embodiment the ratio of armature current to field current is limited to 1, 2.5, and 3.0, respectively, for full field, intermediate field and minimum field conditions. For the AD532 analog multiplier utilized in the present invention and the chosen scaling a multiplying factor of 1 is attained when a negative 3.3 volts is applied to a second input terminal of the device, a multiplying factor of 2.5 is attained when a negative 8.3 volts is applied and a multiplying factor of 3 is attained when a negative 10 volts is applied. Therefore, for a full field condition the armature current feedback or regulating loop will provide a negative 3.3 volts output signal regardless of the magnitude of armature current; however, in an intermediate field or in a minimum field condition the regulating loop will develop an output signal which may range from a negative 3.3 volts to a negative 8.3 or a negative 10 minimum voltage level as a function of the mode of operation of the system. In order to achieve the negative 3.3 volt limited output signal the regulating loop includes a first amplifier 140 which has a resistor voltage divider bias network comprising resistors 142 and 144 connected to supply a negative 3.3 volts to the non-inverting input terminal of the amplifier. An output terminal of amplifier 140 is connected through a diode 146 to the inverting input terminal of the amplifier thereby forming the feedback loop which allows the output voltage of amplifier 140 to be latched to a maximum negative 3.3 volt level. As will be apparent any signal which is developed at the anode terminal of diode 146 and which attempts to go more positive than a negative 3.3 volts will result in the amplifier 140 attempting to develop a voltage at its output terminal which is more negative than 3.3 volts and will cause diode 146 to conduct current in such a manner that its anode will be latched to a negative 3.3 volt level. Such a voltage clamp is well known in the art and is described in the aforementioned text book Operational Amplifiers— Design And Applications. Since the anode terminal of diode 146 is connected to the output terminal of amplifier 138, the regulating loop limits the maxiumum voltage applied to device 128 to a negative 3.3 volts.

A second amplifier 148 provides the 8.3 volt and 10.0 volt negative limits for the regulating loop. Amplifier 148 has a non-inverting input terminal connected to receive the MF signal through a resistor 150. The non-inverting input terminal is also connected to a bias voltage established by a voltage divider comprising resistors 152 and 154. The bias network of resistors 152 and 154 is serially connected between a positive voltage supply and the anode terminal of diode 146. The values of the bias resistors 152 and 154 and the resistor 150 are selected such that when the MF signal is at 0 volts thereby indicating that the mode of operation is either full field or intermediate field, the voltage appearing at the non-inverting input terminal of amplifier 148 will be 0 volts when the voltage on the anode of diode 146 is at a negative 8.3 volts. The resistors 150, 152, and 154 are also selected such that when the MF signal is at a positive level thereby indicating that the system is in a minimum field condition, the voltage at the non-inverting input terminal of amplifier 148 will be 0 volts when the voltage on the anode of diode 146 is at a negative 10.0 volts. It will be appreciated that amplifier 148 includes a feedback circuit having a diode 156 connected between its output terminal and its inverting input terminal in the same manner as amplifier 140 such that the output voltage of amplifier 148 appearing at the anode terminal of diode 156 is limited to values which are at least no more negative than the bias voltage applied to the non-inverting input terminal. Rather than directly limiting the output voltage developed by amplifier 138, the anode terminal of diode 156 is connected to the inverting input terminal of amplifier 138 whereby amplifier 148 operates as a current sink to limit any additional current to amplifier 138 to thereby limit the voltage at the anode of diode 146.

It will be noted that the non-inverting input terminal of amplifier 138 is connected to receive a bias voltage from a bias network comprising resistors 158 and 160, which bias voltage is established by the state of the IF input signal from the train lines. The IF signal is typically 0 volts for intermediate field and minimum field conditions but is a positive voltage for full field conditions. Thus, during full field operation, the output voltage of amplifier 138 is pushed towards a positive voltage thereby assuring that the regulating loop will be in a limiting mode controlled by amplifier 140. In the illustrative example the armature current signal is initially at a large negative value and increases towards 0 as the field current increases. The transfer function of current signal 138 is selected such that at the time that an intermediate field condition is implemented, the voltage at the inverting input terminal will be approximately 0 volts as a result of the increase in the armature current signal. When the intermediate field mode (IF equal 0) is implemented, the output voltage of amplifier 138 will begin to go negative. Once this voltage becomes less than the 3.3 volt clamping level, the regulating loop will control the "gain" of multiplying device 128 in a manner to regulate the armature current signal to the reference level.

In addition to the armature current signal feedback regulating loop there is also an armature current signal feedback loop which generates the signal representative of internal motor voltage drop. This latter feedback loop includes a summing junction 162, substantially identical to summing junction 116, in which the armature signal is converted to a signal proportional to the motor internal voltage drop. The circuit 162 includes an amplifier 162a having a feedback resistor 162b and an input resistor 162c which control the gain thereof in proportion to the resistance of the simulated d-c series wound motor. It is noted that an additional input resistor 162d is connected in series with a switch 162e and the combination of resistor 162d and switch 162e is connected in parallel with the input resistor 162c. The resistor 162d allows the gain of the circuit 162 to be varied if the transit vehicle is being operated in a switch (SW) mode of operation. The switch mode is normally used when the vehicle is to be operated at very low speeds with high starting torque such as would happen in a switching yard. In the switch mode the train line SW signal will cause the switch 162a to be closed thereby decreasing the input resistance of the circuit 162 and consequently increasing its gain such that the armature current feedback signal is at a higher value when applied to the summing junction 118 and will reduce the effective armature voltage signal which junction 118 is producing. Circuit 162 therefore allows simulation of the switch mode of operation of a resistor controlled d-c motor circuit in which a series resistor is maintained in series circuit with a d-c motor. The switch 162e may be, for example, a CD4016 analog switch of the type previously identified.

As can be seen, the inventive circuit arrangement effectively simulates the action of a train line controlled d-c series wound motor and produces an output signal which is proportional to both the armature current and the torque which would be developed by the d-c motor in response to the train line command signals. While the principals of the invention have now been made clear in an illustrative embodiment, there will be immediately obvious to those skilled in the art many modifications in structure, arrangement, proportions, elements, materials, and components, used in the practice of the invention and otherwise, which are particularly adapted for specific environments and operating requirements, without departing from those principals. The appended claims are therefore intended to cover and embrace any such modification, within the limits of the true spirit and scope of the invention.

What we claim as new and desire to secure by Letters Patent of the United States is:

1. Apparatus for deriving a signal representative of the magnitude of armature current which would exist in a direct current(d-c), series-wound traction motor during selected operating states of the motor, said selected operating states being represented by a plurality of status signals, said apparatus comprising:
    a. first means responsive to the status signals for providing a first signal indicative of the ratio of the applied voltage magnitude to the rotational velocity of the armature of the d-c motor;
    b. function generator means responsive to said first signal for producing a second signal representative of the magnitude of current which would exist in the series field of the d-c motor when the voltage-to-velocity ratio of the motor is the same as that indicated by said first signal;
    c. second means responsive to the status signals for developing a multiplying factor that is unity when the defined motor operating state is such that field current would equal armature current and exceeds that unity during field weakening states of the motor; and
    d. third means responsive to said second signal and to said multiplying factor for producing a third signal representative of the product of field current and said multiplying factor.

2. The invention as defined in claim 1 and including fourth means for multiplying said first signal by said third signal to produce a fourth signal representative of the torque which would be produced by a d-c series wound motor having the characteristics identified by the plurality of status signals.

3. The invention as defined in claim 2 wherein said first means comprises:
    a. a scaling circuit for producing a fifth signal having a value that varies with said applied voltage magnitude;
    b. a first summing junction for summing with said fifth signal a sixth signal having a value that varies with the internal voltage drop which would exist in the d-c motor given the operating state identified by the plurality of status signals, said first summing junction providing a seventh signal comprising the sum of said fifth and sixth signals; and
    c. arithmetic means for dividing said seventh signal by the rotational velocity of the armature of the d-c motor to produce said first signal.

4. The invention as defined in claim 3 wherein said sixth signal is derived by means for multiplying said third signal by a proportionality constant representative of the ohmic magnitude of the internal resistance of the motor.

5. The invention is defined in claim 4 wherein said second means comprises:
    a. a second summing junction for receiving said third signal and an armature current reference signal for providing an error signal representative of the difference therebetween; and
    b. a limit circuit connected for receiving said error signal and for converting said error signal to said multiplying factor, said limit circuit being responsive to the status signals for limiting said multiplying factor to selected maximum and minimum values whereby said third signal is regulated to a predetermined magnitude when said multiplying factor is between said maximum and minimum values and said third signal decreases at a predetermined rate when said multiplying factor is limited at said maximum or said minimum values.

6. The invention as defined in claim 5 wherein the status signals to said limit circuit comprise:
   a. field weakening signals indicative of the commanded maximum and minimum ratio of field current to armature current for the d-c motor;
   b. a reference signal indicative of the desired magnitude of armature current; and
   c. a load weight signal for modifying said reference as a function of the load imposed on the d-c motor.

7. The invention as defined in claim 6 wherein said proportionality constant is derived in a circuit comprising:
   a. an operational amplifier including a feedback resistor and a first input register sized to provide a gain proportional to the ohmic magnitude of the internal resistance of the d-c motor;
   b. a second resistor;
   c. a controllable switch connected in series with said second resistor, said series combination of controllable switch and second resistor being connected in parallel with said first input resistor; and
   d. means connecting selected status signals to said controllable switch whereby said second resistor may be selectively inserted in parallel with said first input resistor.

8. The invention as defined in claim 7 wherein said scaling circuit includes means responsive to selected status signals for modifying said fifth signal to simulate series and parallel connection of a plurality of d-c motors.

9. In an electric powered train equipped to be powered from an external power source and including a plurality of individually propelled vehicles wherein at least one of the vehicles is propelled by a series wound direct current (d-c) traction motor controlled by a plurality of trainline signals specifying selected operating states of the d-c motors, apparatus for converting the train line signals to a corresponding armature current command signal comprising:
   a. means for supplying a first signal representative of the voltage magnitude of said external power source to said apparatus;
   b. subtracting means for subtracting from said first signal a second signal representative of the internal voltage drop of the d-c motor to obtain a difference signal representing effective armature voltage;
   c. means for obtaining a third signal representative of the angular velocity of the rotor of the d-c motor;
   d. means for dividing said difference signal by said third signal to obtain a fourth signal representative of the volts per revolution per minute of the d-c motor;
   e. function generator means connected to convert said fourth signal into a fifth signal representative of the magnitude. of field current which would exist in the d-c motor at that magnitude of said fourth signal; and
   f. first multiplying means for multiplying said fifth signal by a factor representative of the value of field weakening commanded for the d-c motor to produce at an output terminal thereof a sixth signal representative of armature current in the d-c motor.

10. The apparatus as defined in claim 10 and including second multiplying means for multiplying said sixth signal by said fourth signal to obtain a torque signal representative of the torque of the d-c motor.

11. In a train of traction vehicles having at least one vehicle thereof connected to be propelled by a non-series would electric traction motor and including a power control system responsive to a commanded torque signal to regulate the torque of the electric traction motor to the commanded value, the apparatus as defined in claim 10 wherein said torque signal is coupled to said power control system.

12. The apparatus of claim 11 wherein said non-series wound electric traction motor comprises an alternating current induction motor.

13. The apparatus as defined in claim 9 wherein said second signal is generated in a feedback circuit comprising an operational amplifier connected between said output terminal of said first multiplying means and an input terminal of said subtracting means.

14. The apparatus as defined in claim 9 wherein said first multiplying means comprises:
   a. an analog multiplier having a first input terminal connected to receive said fifth signal and a second input terminal connected to receive a multiplying factor, said multiplier producing said sixth signal at an output terminal thereof;
   b. a first summing junction for receiving said sixth signal and an armature current reference signal and for producing an error signal representative of the difference therebetween; and
   c. a limit circuit connected for receiving said error signal and for converting said error signal to said multiplying factor, said limit circuit being responsive to the status signals for limiting said multiplying factor to selected maximum and minimum values whereby said sixth signal is regulated to a predetermined magnitude when said multiplying factor is between said maximum and minimum values and said sixth signal decreases at a predetermined rate when said multiplying factor is limited at said maximum or said minimum values.

15. In a control system for an electric motor adapted to propel a variable speed traction vehicle, said motor being energized by voltage from a wayside electric power source, said control system including means tending to regulate the motor armature current to a predetermined magnitude and means for providing first, second and third status signals representative, respectively, of the magnitude of said voltage, of the angular velocity of the wheels of said vehicle and of a minimum allowable ratio of armature current to field current, the combination of:
   a. first means for providing a first signal indicative of the ratio of the value of said first status signal to the value of said second status signal;
   b. function generator means connected to said first means for producing a second signal that varies as a predetermined non-linear function of said first signal;
   c. second means responsive to said third status signal for developing a multiplying factor which varies between unity and said minimum ratio in a manner tending to regulate said armature current;
   d. third means connected to said function generator means and to said second means for producing a third signal representative of the product of said multiplying factor and the value of said second signal; and e. fourth means for utilizing said third signal in the control of the tractive effort of said vehicle.

16. The system of claim 15 wherein said predetermined non-linear function matches the armature volt-seconds per revolution versus field current characteristic of a d-c series-wound traction motor, whereby said second signal is representative of the magnitude of current in the series field of such a motor when running at the armature volt-seconds per revolution indicated by said first signal and said third signal is consequently representative of the armature current in such a motor.

17. The system of claim 16 wherein said first status signal is provided by means for sensing the voltage energizing the motor propelling said vehicle and said second status signal is provided by means for sensing the rotational velocity of said propulsion motor.

18. The system of claim 17 wherein said predetermined magnitude of armature current is varied in response to a fourth status signal representative of the weight of said vehicle.

* * * * *